United States Patent [19]

Burns

[11] Patent Number: 5,220,771
[45] Date of Patent: Jun. 22, 1993

[54] TETRAHEDRON VOLUME CONTROL

[75] Inventor: Richard H. Burns, Spartanburg, S.C.

[73] Assignee: Milliken Research Corporation, Spartanburg, S.C.

[21] Appl. No.: 868,226

[22] Filed: Apr. 14, 1992

[51] Int. Cl.$^5$ .............. B65B 9/12; B65B 51/30; B65B 61/24

[52] U.S. Cl. .............. 53/551; 53/113; 53/374.5

[58] Field of Search .............. 53/551, 552, 554, 113, 53/373.5, 374.2, 374.5, 374.6

[56] References Cited

U.S. PATENT DOCUMENTS

| | | | |
|---|---|---|---|
| 2,738,631 | 3/1956 | Järund | 53/551 |
| 2,784,540 | 3/1957 | Järund | 53/551 |
| 3,320,718 | 5/1967 | Thesing | 53/551 |
| 3,546,835 | 12/1970 | Mobley | 53/551 X |
| 4,450,669 | 5/1984 | Rapparini | 53/551 |
| 4,614,078 | 9/1986 | Kawabe | 53/551 |
| 4,637,199 | 1/1987 | Steck et al. | 53/551 X |

Primary Examiner—Horace M. Culver
Attorney, Agent, or Firm—Earle R. Marden; Terry T. Moyer

[57] ABSTRACT

A tetrahedronal packaging machine packaging liquids which has a package-forming member mounted on each heat jaw to maintain the shape of the package being filled. The package-forming member is spring loaded to allow the forming member to be rotated to a second position to provide a different size package of liquid fill.

5 Claims, 4 Drawing Sheets

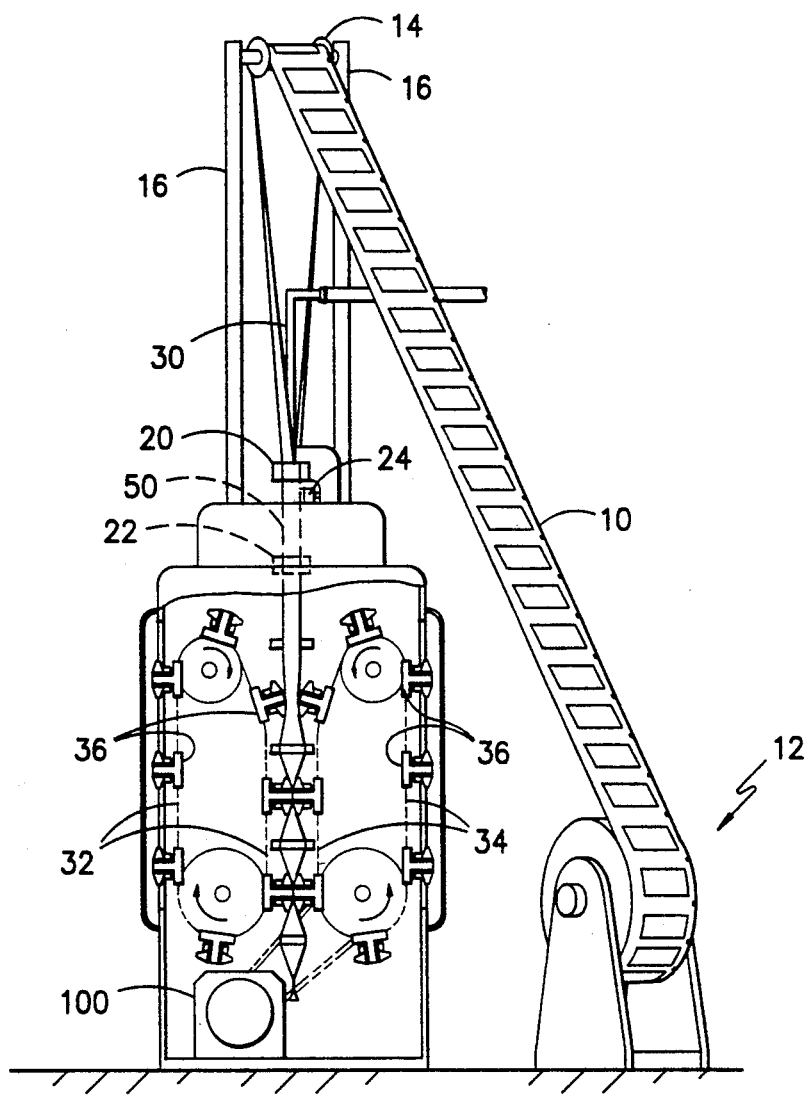
FIG. -1-
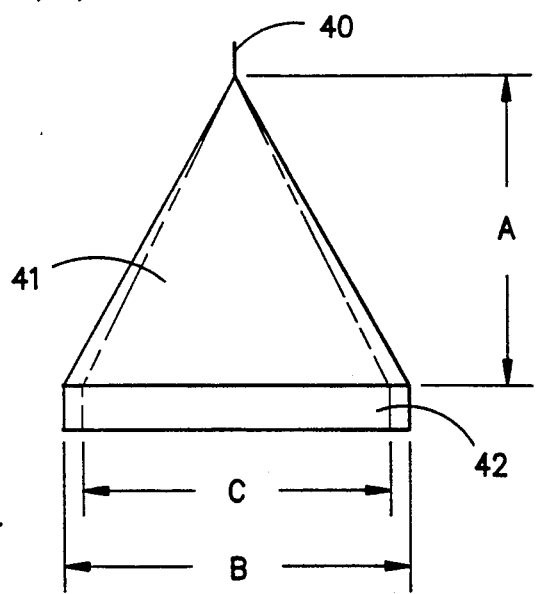
FIG. -2-

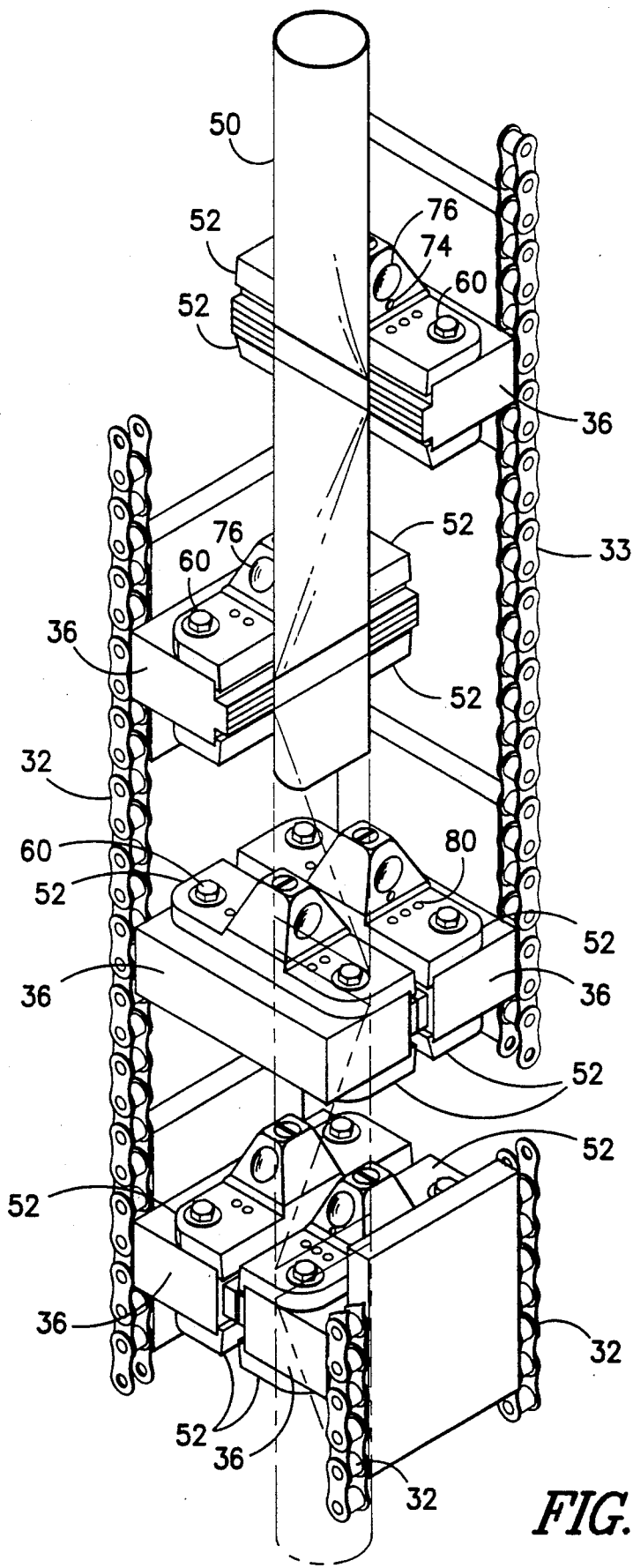
FIG. -3-

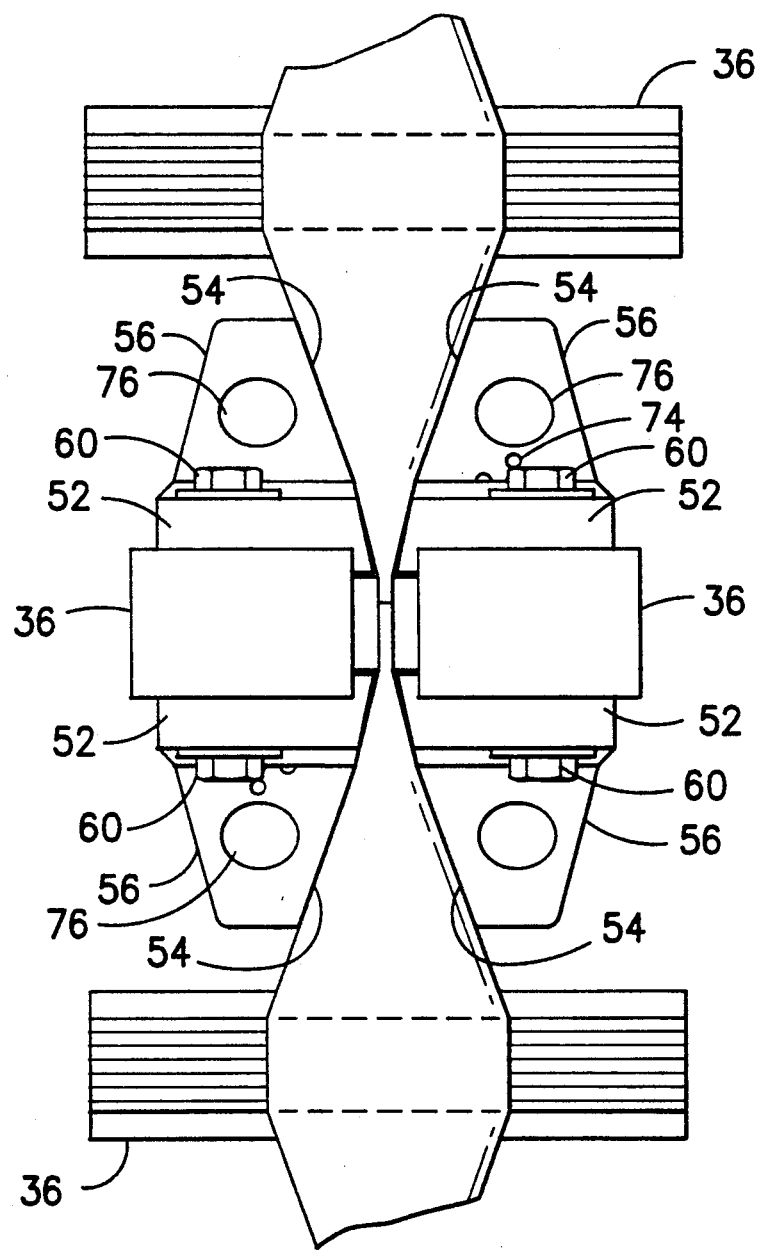
FIG. —4—

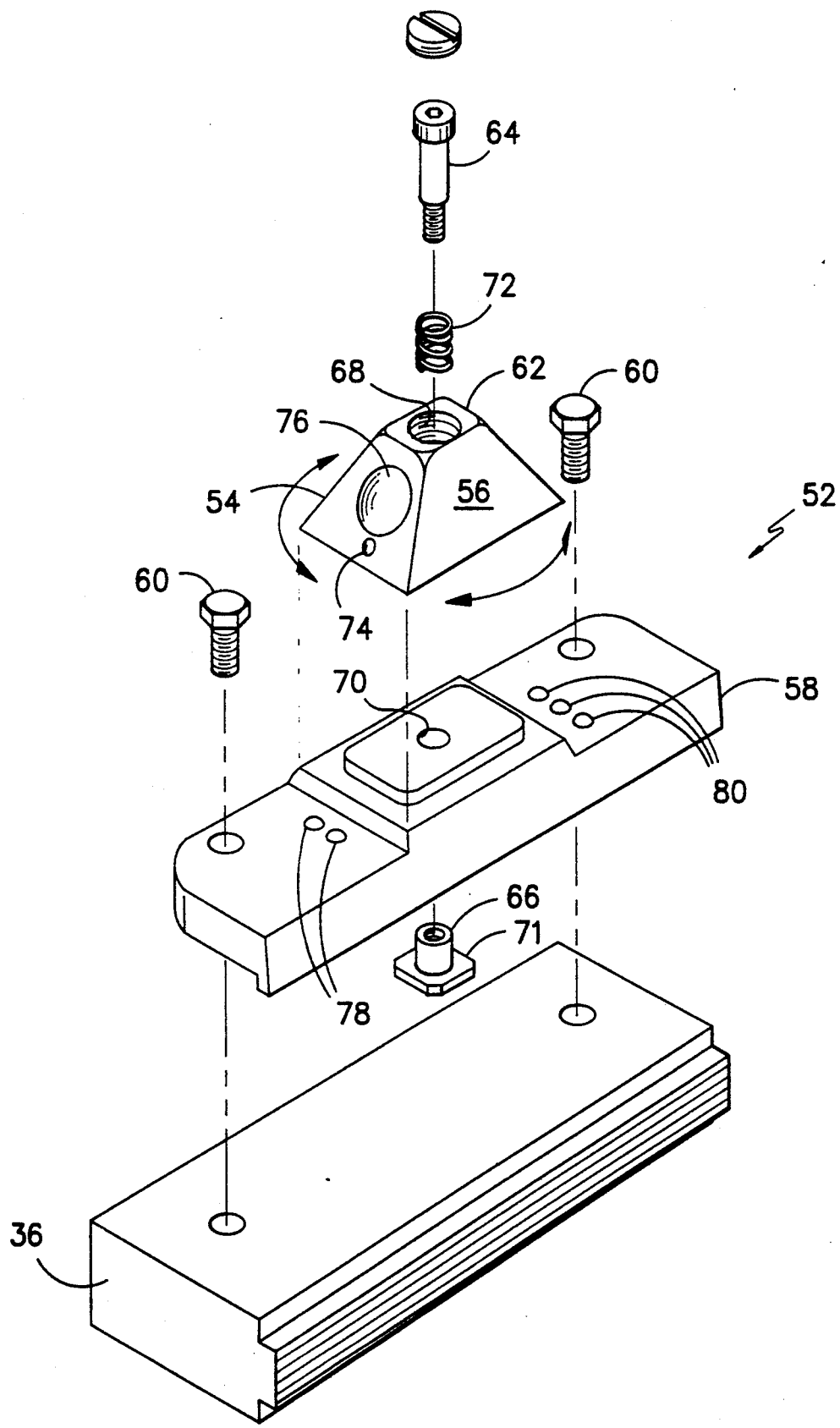
FIG. −5−

TETRAHEDRON VOLUME CONTROL

This invention relates to an apparatus to ensure the production of a filled tetrahedron having the desired amount of liquid product therein.

Machines which are designed to produce cushion shaped, parallelepedic, or tetrahedral packages from a continuous roll or flat web of packaging material are well known in the packaging industry. Commonly, such machines are of the "form-fill-seal" variety, in which a continuous flat web of suitable packaging material, e.g., wax or plastic-coated paper, is formed into a vertically oriented tube-like structure by means of passing the web through one or more ring-like guides, with a seam formed by adhesively joining the opposed longitudinal edges of the web. The tube is then filled with the desired product. By compressing opposing sides of the tube in the presence of an adhesive or, more commonly, heat, the tube may be transversely sealed as the tube is moved through the machine by the action of opposed sets of sealing jaws, thereby forming individual packages. The separate, connected packages may then be separated from one another by cutting the sealed tube segments in the region of the transverse seams.

In machines of the above-described type it is desired that the packages formed have the exact desired amount of liquid product therein. Under-filled packages create problems for the retailer and the consumer while over-filled packages increase the overall cost of the package producer. In the past package forming members have been used to maintain the shape of the package being filled but have to be removed and replaced with other package formers when it is desired to produce packages with a different amount of liquid product therein.

Therefore, it is an object of the invention to provide an apparatus to produce accurately filled tetrahedron containers which can be readily changed to accurately produce a tetrahedron container with a different amount of liquid product therein.

Further details and advantages of the invention will become apparent from the discussion below, when read in conjunction with the accompanying Figures, in which FIG. 1 is a schematic drawing of a form-fill-seal packaging machine designed to make tetrahedral-shaped containers filled with product. The containers are made from a continuous flat strip or web of suitable packaging material;

FIG. 2 is a schematic representation of a tetrahedron-shaped package illustrating the dependence of package length on tube diameter;

FIG. 3 is a schematic representation of the heating jaw arrangement;

FIG. 4 is a schematic representation of the new and novel package-forming apparatus in situ against a formed tetrahedron, and FIG. 5 is an extended view of the package deformation apparatus showing details of construction.

As is well known in the art, filled tetrahedron-shaped containers can be formed from a web of sheet material such as polyethylene coated paper stock. As seen in FIG. 1, and, to some extent, FIGS. 3 and 4, a typical tetrahedron-forming machine 8 forms tetrahedron-shaped filled containers such as is depicted in FIG. 2 from a roll or web of pre-printed flat package stock, e.g., a polyethylene coated paper. The paper 10 is supported on a suitable support 12 and is delivered upwardly over one or more flanged guide rolls 14 supported by frame members 16 secured to the machine. The paper 10 is delivered downwardly through an oval collar 20 which longitudinally curls the paper by bending the longitudinal edges of the sheet material toward one another. From the collar the sheet material passes through a circular forming ring 22 where the overlap of the longitudinal edges is completed, and the package stock is in closed, cylindrical (i.e., tube) form, identified at 50. An elongate heater 24 seals together the overlapped longitudinal edges with the assistance of a set of opposed rollers, not shown, between which the heated overlapped edges are pressed together.

A fill pipe 30 is positioned to extend within the tube 50 of package stock, and extends to a point above the region where the transverse seals are formed. To form such transverse seals in the embodiment shown, two sets of opposed, endless chains carrying opposed heated sealing jaws 36 at fixed locations along the chains are continuously and uniformly rotated by sprockets driven by motor 100. One set of endless chains is represented by reference numerals 32 and 34 while the second set of chains and sprockets 33 is axially displaced 90° from the first set of chains, i.e., to the front and rear of the view depicted in FIG. 1. As shown, the heating jaws 36 mounted on the first set of chains form a transverse seal below the level of product in tube 50 and simultaneously advance tube 50, via a pulling action, downwardly through the machine in a continuous motion. The heating jaws 36 on each set of chains are spaced two package lengths from one another. The heating jaws on the second set 33 of chains are located between, and axially displaced from, the heating jaws on the first set of chains, so as to form a second seal, also below the level of product, which is one package length away from and transverse to the first seal. Due to the staggered or interleaved relative positioning of the jaws on the first and second sets of chains, the top-most seal will be made by jaws carried on the first set of chains, then by jaws carried on the second set of chains, in alternating fashion. It can be seen that the continuously moving heating jaws 36 will form a first seal in a region already occupied by product while the product is being supplied from the fill pipe 30, will advance the tube downwardly through the machine, will form a second, transverse seal, also in a region occupied by product, and will supply a continuous chain of packages to a cutting means, not represented in FIG. 1, wherein each of the transverse seals is severed along its length to form individual tetrahedron-shaped packages.

As discussed previously, it is very difficult to maintain registration of printed matter on sheet packaging material in a tetrahedron-forming machine which operates continuously and has the sealing jaws fixed in spaced relation to one another. In a tetrahedron-shaped package 41, as shown in FIG. 2, the vertical distance A is less than the net length of sheet material between the transverse seals 40 and 42. This is due to the fact that, as measured perpendicular to the longitudinal axis of tube 50, adjacent transverse seals are formed at right angles to each other, and the sheet material therefore may be thought of as extending along the hypotenuse of a triangle. The net length of the sheet material between the transverse seals is a function of the diameter or perimeter length of the tubular-shaped sheet material from which it is formed. As the diameter or perimeter length of the tubular-shaped sheet material decreases, the net length of the material approaches the vertical distance A. Conversely, the net length of the material increases as the diameter or perimeter length of the material increases FIG. 2 illustrates this principle by indicating that, when the diameter or perimeter length of the tubular sheet material is large, as indicated by the length B of the transverse seal, a package, indicated in solid lines, is obtained which has a net wall length which is longer than the net wall length of the package shown in phantom lines. This "phantom line" package depicts a package made from a section of tubular sheet material which has a reduced diameter or perimeter indicated by the transverse seal length C. Thus, it can be seen that the amount of sheet material in each tetrahedron-shaped package, and therefore the net length of such package, can be controlled by controlling the diameter or circumferential length of the tubular sheet material from which the package is formed.

Typically in machines of the type depicted in FIG. 1, a photocell is used to detect indicia or registration marks uniformly spaced along the edge of the package material web. Variations in the rate at which such marks pass the photocell may then be used to adjust in some way the rate at which packages are made. For example, as disclosed in U. S. Pat. No. 3,546,835, the rate of package formation may be regulated by controlling the degree to which the opposing edges of the web are made to overlap. This may be accomplished by varying the diameter or circumferential length of the tube-forming collar (analogous to collar 20 or ring 22 of FIG. 1) in accordance with rate variations detected by the photocell.

Even though the registration on the machine may be correct, there is a tendency for the package 41 to be overfilled with product due to the flexibility of the package material. This has been corrected by mounting a package former on each heating jaw 36 to hold the shape of the tetrahedron package 41. In the past, when the volume of product to be placed in the package was changed, it was necessary to remove and replace each package former on each jaw 36 to adapt the machine to the new desired volume.

To alleviate this problem the herein adjustable package former 52 is used. As shown in FIG. 4 one of the surfaces 54 or 56 abuts the tetrahedral package 41 and cooperates with the package former 52 on the opposing heat jaw to hold the package configuration. Package formers 52 are mounted on the top and bottom of each heating jaw in order to maintain the proper desired volume of liquid therein.

The surfaces 54 and 56 of the package former 52 are cut at different angles to allow filling of different volumes of liquid in the tetrahedron container 41. As shown in FIG. 5 the package former 52 consists of a base member 58 which attaches to the heat jaw 36 by suitable screws 60 and the package engaging member 62 with surfaces 54 and 56 thereon. The package engaging member 62 is adjustably secured to the base member 58 by the screw 64 which engages the nut 66 through the openings 68 and 70. The nut 66 has a flange 71 which fits into the bottom of the base member 58. To provide adjustability a spring member 72 fits in and is held in the opening 68 and allows the package engaging member to be pulled upwardly against the bias of spring 72 and rotated to place either surface 54 or 56 in tetrahedron engaging position. Located on one side of the package engaging member is an indicia 74 below the finger cutout 76 which matches up with indicia 78 or 80 to indicate the position of the desired package engaging surface 54 or 56. It can be seen that to change from one volume of liquid to another, the operator merely repositions all the package engaging member 62 to the desired setting. This operation eliminates the removal and replacement of all the package-forming members 52 whenever it is desired to change the volume of liquid to be packaged. The angle of the package engaging surfaces 54 and 56 are selected to provide an accurate volume for the particular product or products to be packaged.

Other embodiments can be employed within the scope of the invention and it is therefore desired that the disclosed invention be limited only by the scope of the claims.

I claim:

1. A packaging machine for continuously producing packages from a web of packaging material, said web being supplied to said machine via roll means positioned in a path of said web, said web contacting said roll means so as to impart rotary motion to said roll means, said machine including tube forming means positioned in the path of said packaging material by which said material is formed into an elongate tube, said packages being formed by the action of opposed sealing means, positioned in the path of said packaging material following said roll means, which sealing means compress and seal together opposite sides of said tube along narrow zone disposed transversely to the longitudinal axis of said tube, said sealing means also serving to advance said tube through aid machine, said seal means comprising a plurality of pairs of heating jaws with the jaws in each pair mounted to oppose one another and adjustable package forming means mounted on the top and bottom of each heating jaw to contact and maintain the shape of a package formed between said jaws, said adjustable package forming means each having a base plate and a spring hinged forming member mounted thereon, said forming member each having an axis substantially perpendicular to said base plate and at least two outer surfaces forming an angle to said axis with the degrees of angle of one surface being different from the degrees of angle of the other surface.

2. The machine of claim 1 wherein adjacent pairs of jaws are mounted 90° from one another to form tetrahedronal packages.

3. The packaging machine of claim 2 wherein one side of said package forming member has indicia thereon and the upper surface of said base plate has two different types of indicia thereon so if said package forming member is moved against the bias of said spring biased forming member and rotated the indicia thereon will cooperate with one of the two indicia on the base plate to indicate which outer surface of the package forming member is in the desired position.

4. A package forming member comprising: a base plate and a truncated member having an axis substantially perpendicular to and mounted on said base plate with a spring therein to allow the truncate member to be rotated, said truncated member having at least two opposing outer surfaces thereof cut at different degrees of angle to the axis of said truncated member whereby one or the other of said surfaces can be positioned into operative position against the outer surface of a formed package.

5. The member of claim 4 wherein one of the surfaces of the truncated member has indicia thereon, said base plate having at least two spaced indicia on the upper surface thereof which cooperate with the indicia on the truncated member to indicate which outer surface thereof is in the desired position.

* * * * *